(12) United States Patent
Numajiri (10) Patent No.: US 7,895,744 B2
(45) Date of Patent: Mar. 1, 2011

(54) METHOD OF REPLACING WIND TURBINE EQUIPMENT

(75) Inventor: Tomohiro Numajiri, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 62 days.

(21) Appl. No.: 12/445,199

(22) PCT Filed: May 28, 2008

(86) PCT No.: PCT/JP2008/059799
§ 371 (c)(1),
(2), (4) Date: Apr. 10, 2009

(87) PCT Pub. No.: WO2008/155983
PCT Pub. Date: Dec. 24, 2008

(65) Prior Publication Data
US 2010/0011575 A1     Jan. 21, 2010

(30) Foreign Application Priority Data
Jun. 19, 2007    (JP) ................................ 2007-161652

(51) Int. Cl.
*B23P 6/00* (2006.01)
(52) U.S. Cl. .......... 29/889.1; 29/426.3; 290/55; 254/334; 254/335
(58) Field of Classification Search ................. 29/889.1, 29/889, 428, 889.21, 426.1, 426.3; 290/55; 254/334, 335
See application file for complete search history.

(56) References Cited

U.S. PATENT DOCUMENTS

| 2005/0019166 A1* | 1/2005 | Bervang ................. 416/244 A |
| 2006/0120809 A1* | 6/2006 | Ingram et al. .............. 405/195.1 |
| 2006/0151767 A1* | 7/2006 | Wobben ........................ 254/334 |
| 2008/0216301 A1* | 9/2008 | Hansen et al. ................... 29/428 |
| 2009/0267038 A1* | 10/2009 | Teichert et al. ................ 254/335 |
| 2010/0028152 A1* | 2/2010 | Numajiri et al. ........... 416/146 R |
| 2010/0043227 A1* | 2/2010 | Numajiri ........................ 29/889 |

FOREIGN PATENT DOCUMENTS

| EP | 1101934 A2 | 5/2001 |
| EP | 1291521 A1 | 3/2003 |
| JP | 2004512244 A | 4/2004 |
| JP | 2004293455 A | 10/2004 |
| JP | 2005531709 A | 10/2005 |

OTHER PUBLICATIONS

ISR for PCT/JP2008/059799 mailed Sep. 2, 2008.

* cited by examiner

*Primary Examiner* — David P Bryant
*Assistant Examiner* — Ryan J Walters
(74) *Attorney, Agent, or Firm* — Kanesaka Berner and Partners LLP (57) ABSTRACT

A method of replacing wind turbine equipment, which can reduce the cost for replacing large equipment disposed in a nacelle, is provided. The method is characterized by including a winch-hoisting step for winching up to a nacelle a reciprocating winch that is used for replacing the wind turbine equipment disposed in the nacelle mounted atop a tower and a balance supporting the wind turbine equipment with an ordinarily-installed winch provided on a girder that moves in the nacelle; a wire-hoisting step for hoisting a wire that is used for the replacement of the wind turbine equipment to the nacelle from a drum disposed on the ground; a winch-replacing step for detaching the ordinarily-installed winch from the girder and attaching the winch for replacement to the girder; and a wire-arranging step for arranging the hoisted wire on the reciprocating winch and a movable pulley provided between the balance and the girder.

1 Claim, 12 Drawing Sheets

METHOD OF REPLACING WIND TURBINE EQUIPMENT

RELATED APPLICATIONS

The present application is based on International Application Number PCT/JP2008/059799 filed May 28, 2008, and claims priority from Japanese Application Number 2007-161652 filed Jun. 19, 2007, the disclosures of which are hereby incorporated by reference herein in their entirety.

TECHNICAL FIELD

The present invention relates to a method of replacing wind turbine equipment, which is suitably used for replacing large equipment disposed in a nacelle of a wind turbine.

BACKGROUND ART

In general, a crane and a winch disposed in a nacelle of a wind turbine generator, which are used for maintenance, are designed so as to be used in periodic inspection and therefore have capacities capable of replacing only lightweight components in the nacelle.

Therefore, when severe trouble occurred in large equipment such as a generator or a transformer, large heavy machinery has been used for replacing such large equipment. The potential risk of severe trouble occurring in the large equipment is not so high, but such severe trouble that occurs in the large equipment has a disadvantage that the cost impact is high due to the use of the large heavy machinery.

In order to avoid the above-mentioned problem, various techniques have been proposed for enabling replacement of large equipment without using large heavy machinery (for example, see Patent Documents 1 and 2).

Patent Document 1: European Patent No. 1101934, Specification

Patent Document 2: European Patent Application, Publication No. 1291521, Specification

DISCLOSURE OF INVENTION

In the above-mentioned Patent Document 1, a crane arm is provided in the nacelle and a winch is disposed on the ground, so that large equipment can be replaced without using large heavy machinery.

However, since the large crane arm must be provided and the crane arm is provided in the nacelle, the nacelle is also enlarged in size. Therefore, this technique has the problem that the cost for replacing large equipment is increased.

In addition, since the winch used has a large capacity capable of hoisting and suspending the large equipment, this technique has the problem that the cost for replacing the large equipment is increased.

In the above-mentioned Patent Document 2, a movable pulley is provided in the nacelle and a winch is disposed on the ground, so that large equipment can be replaced without using large heavy machinery.

However, as in the technique described in the above-mentioned Patent Document 1, since the winch has a large capacity capable of hoisting and suspending the large equipment, this technique has the problem that the cost for replacing the large equipment is increased.

The present invention has been accomplished for solving the above-mentioned problems, and it is an object thereof to provide a method of replacing wind turbine equipment where the cost necessary for replacing of large equipment in a nacelle can be reduced.

In order to achieve the above-mentioned object, the present invention provides the following solution.

The present invention provides a method of replacing wind turbine equipment, including a winch-hoisting step for winching up to a nacelle a reciprocating winch that is used for replacing wind turbine equipment disposed in the nacelle mounted atop a tower and a balance supporting the wind turbine equipment with an ordinarily-installed winch provided on a girder that moves in the nacelle; a wire-hoisting step for hoisting a wire that is used for replacing of the wind turbine equipment to the nacelle from a drum disposed on the ground; a winch-replacing step for detaching the ordinarily-installed winch from the girder and attaching the winch for replacement to the girder; and a wire-arranging step for arranging the hoisted wire on the reciprocating winch and a movable pulley provided between the balance and the girder.

According to the invention, by changing from the ordinarily-installed winch having a drum for winding a wire to a reciprocating winch not having a drum and by supplying wire that is used for replacing the wind turbine equipment from the drum disposed on the ground, it is possible to use a movable pulley whose usable length of wire is long. With this, the ability or capacity required in the reciprocating winch can be reduced compared with the case where the movable pulley is not used. Therefore, the cost for the replacement operation can be reduced. In addition, since the wind turbine equipment can be replaced without using, for example, large heavy machinery, the replacement operation is easier, resulting in a reduction in the cost for the replacement operation.

When the wind turbine equipment is replaced, the wire used for replacing of the wind turbine equipment is hoisted from the drum disposed on the ground. Therefore, it is not necessary to ensure a space for disposing the drum in the nacelle. In particular, since the length of the wire necessary for using the movable pulley is long, the size of the drum for winding the wire tends to be large. Even in such a case, the nacelle can be prevented from increasing in size by disposing the drum on the ground. Consequently, the cost for replacing the wind turbine equipment can be reduced.

According to the method of replacing the wind turbine equipment of the present invention, the ordinarily-installed winch having a wire wound drum is replaced by a reciprocating winch not having a drum, and also the wire that is used for replacing the wind turbine equipment is supplied from the drum disposed on the ground. Consequently, an advantage is afforded in that the cost of replacing the wind turbine equipment, which is the large equipment in the nacelle, can be reduced.

BEST MODE FOR CARRYING OUT THE INVENTION

The wind turbine according to an embodiment of the present invention will be described with reference to FIGS. 1 to 14.

Figure 1:
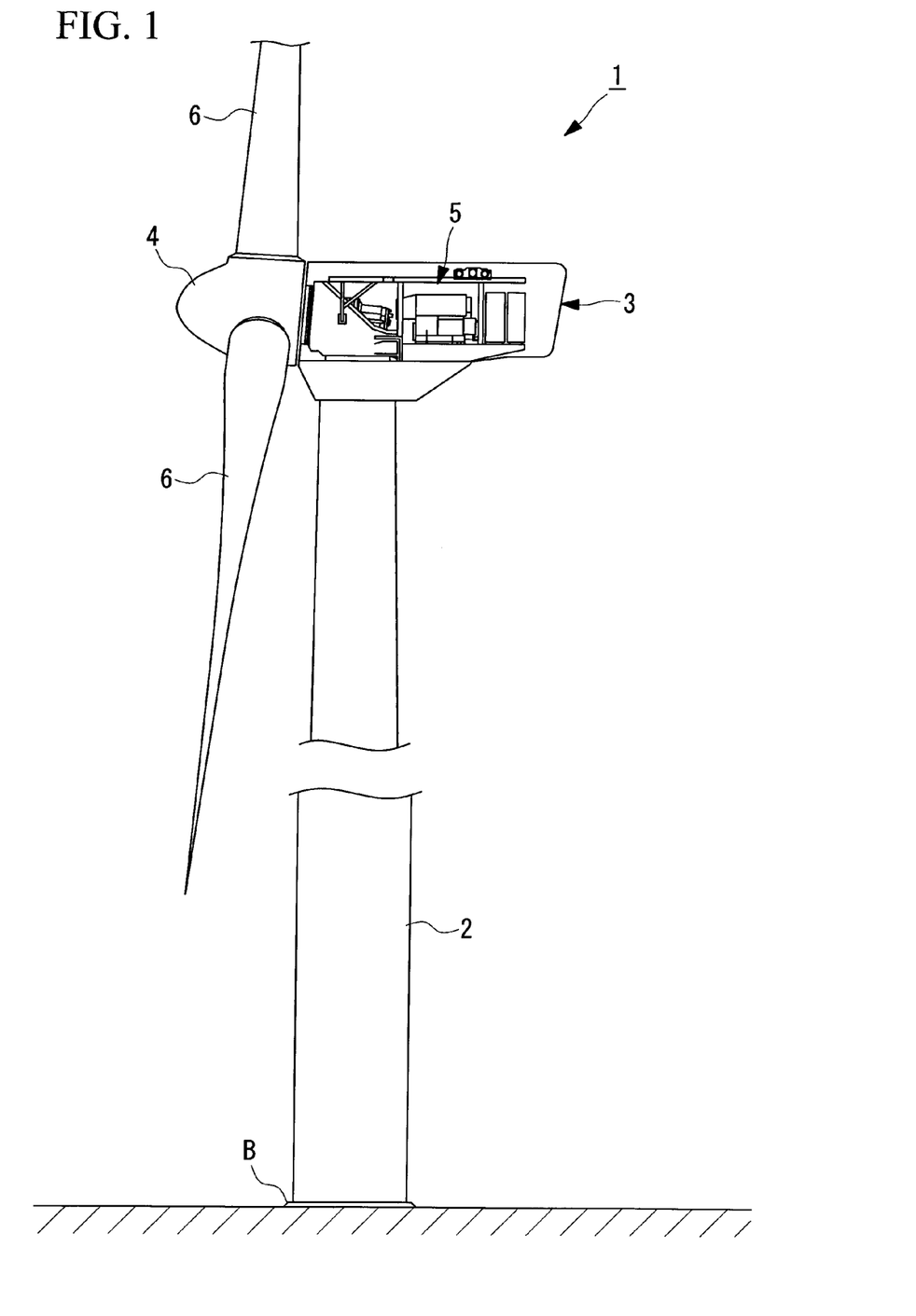
FIG. 1 is a diagram illustrating the schematic structure of a wind turbine according to an embodiment of the present invention.

FIG. 1 is a diagram illustrating the schematic structure of the wind turbine according to this embodiment.

As shown in FIG. 1, the wind turbine 1 is for wind power generation. The wind turbine 1 includes a tower 2 vertically installed on a base B, a nacelle 3 mounted atop the tower 2, a rotor head 4 provided on the nacelle 3 so as to be rotatable around an approximately horizontal axis, and electricity-generating equipment (wind turbine equipment) 5 generating electricity through rotation of the rotor head 4.

The rotor head 4 is fitted with a plurality of wind turbine blades 6 that are arranged radially around the rotation axis thereof. With this, wind blowing against the wind turbine blades 6 from the direction of the rotation axis of the rotor head 4 generates a force on the wind turbine blades 6, causing the rotor head 4 to rotate around the rotation axis. Thus, the rotor head 4 is rotated.

The tower 2 extends upward (the top in FIG. 1) from the base B to form a columnar structure, for example, a structure composed of a plurality of units connected in the vertical direction. The nacelle 3 is mounted atop the tower 2. When the tower 2 is composed of a plurality of units, the nacelle 3 is mounted on the unit disposed on the uppermost position.

Figure 2:
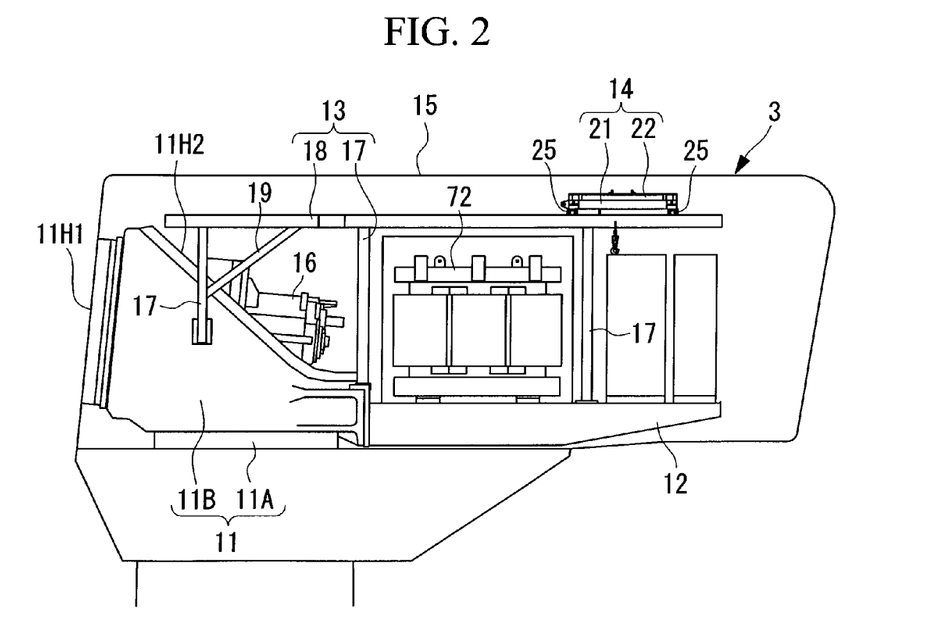
FIG. 2 is a side view illustrating the structure of the nacelle of FIG. 1.
Figure 3:
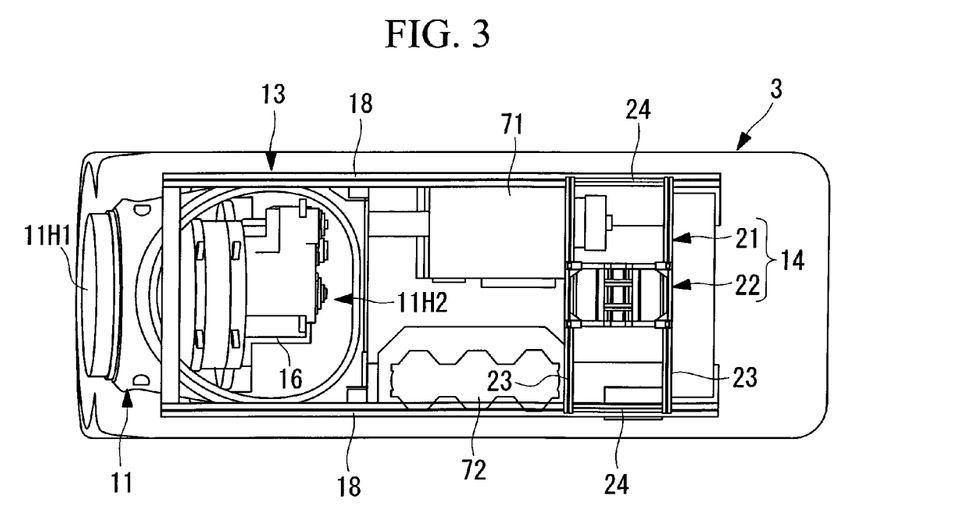
FIG. 3 is a top view illustrating the structure of the nacelle of FIG. 1.

FIG. 2 is a side view illustrating the structure of the nacelle of FIG. 1. FIG. 3 is a top view illustrating the structure of the nacelle of FIG. 1.

As shown in FIGS. 2 and 3, the nacelle 3 rotatably supports the rotor head 4 and also stores the electricity-generating equipment 5 in the inside thereof.

The nacelle 3 includes a nacelle baseplate 11 attached to the upper end of the tower 2, a lower frame 12 fixed to the nacelle baseplate 11, an upper frame 13 fixed to the nacelle baseplate 11 and the lower frame 12, a girder portion (girder) 14 arranged on the upper frame 13, and a nacelle cover 15 covering the electricity-generating equipment 5 and other equipment from the upper side.

The nacelle baseplate 11 is provided on the tower 2 so as to be rotatable around the vertical axis, in other words, rotatable in a horizontal plane. The direction of the nacelle 3 can be changed by turning the nacelle baseplate 11 around the vertical axis by means of a driving mechanism (not shown).

As shown in FIG. 2, the nacelle baseplate 11 is a structure in which a base portion 11A approximately horizontally fixed to the upper end of the tower 2 and a casing portion 11B covering the base portion 11A from the upper side are integrated, for example, integrated as a casting.

The casing portion 11B is provided with a first opening 11H1 at a position (the left end in FIG. 2) facing the rotor head 4 and a second opening 11H2 at a position (the right end in FIG. 2) facing the first opening 11H1.

The lower frame 12 is fixed to the rear end (the right end in FIG. 2) of the base portion 11A of the nacelle baseplate 11, and post members 17 of the upper frame 13 are fixed to the base portion 11A and the casing portion 11B.

Furthermore, a gear box 16 that transmits rotation driving force of the rotor head 4 to a generator 71 described below is provided in the inside of the nacelle baseplate 11. The gear box 16 is connected to the rotor head 4 through the first opening 11H1 and is connected to the generator 71 through the second opening 11H2.

As shown in FIGS. 2 and 3, the lower frame 12 is a supporting member on which the electricity-generating equipment 5 is disposed on the upper surface thereof. The lower frame 12 is fixed to the nacelle baseplate 11 and is arranged so as to extend backward (rightward in FIG. 2) from the nacelle baseplate 11.

The lower frame 12 is provided with an opening (not shown) for carrying-in or carrying-out of, for example, the electricity-generating equipment 5, and the post members 17 of the upper frame 13 are fixed to the lower frame 12.

As shown in FIGS. 2 and 3, the upper frame 13 is a structure formed by combining rod-like members arranged in the inside of the nacelle cover 15 over the nacelle baseplate 11 and the lower frame 12.

The upper frame 13 includes the post members 17 fixed to the nacelle baseplate 11 and the lower frame 12 and includes beam members 18 connecting the upper ends of the post members 17.

The post members 17 are arranged at both side faces of the nacelle baseplate 11 and the lower frame 12 such that three posts are aligned in the longitudinal direction (in the horizontal direction in FIGS. 2 and 3) at each side.

The beam members 18 extend in the longitudinal direction and are each arranged so as to connect the upper ends of the three aligning post members 17. These beam members 18 also function as longitudinally extending rails of a longitudinally extending winch girder 21 described below.

Connections of the post members 17 arranged at the rotor head 4 side and beam members 18 are provided with diagonal braces 19 for increasing the structural strength of the upper frame 13.

The girder portion 14 is used for carrying-in and carrying-out devices used for maintenance of the wind turbine 1 and relatively lightweight materials, for example, consumables such as lubricant oil, and is also used for carrying-in and carrying-out the electricity-generating equipment 5, which is heavier than these materials. The girder portion 14 is arranged on the beam members 18 of the upper frame 13.

As shown in FIGS. 2 and 3, the girder portion 14 includes the longitudinally extending winch girder 21 longitudinally extending over the upper frame 13 and a transversely extending winch girder 22 transversely extending over the longitudinally extending winch girder.

The longitudinally extending winch girder 21 includes a pair of transversely extending rails 23 extending in the width direction (the vertical direction in FIG. 3) of the nacelle 3 and arranged so as to extend over the pair of beam members 18, a pair of longitudinally extending frames 24 connecting the transversely extending rails 23, and longitudinally extending rollers 25 arranged between the beam members 18 and the transversely extending rails 23 or the longitudinally extending frames 24. The longitudinally extending winch girder 21 has an approximately rectangular structure due to these transversely extending rails 23 and the longitudinally extending frames 24.

The transversely extending winch girder 22 transversely extends on the transversely extending rails 23 and is detachably attached with an ordinarily-installed winch 31 and a reciprocating winch 41, which are described below. First, the structure of the transversely extending winch girder 22 will be described with reference to the drawing showing the state where the ordinarily-installed winch 31 is attached thereto.

Figure 4:
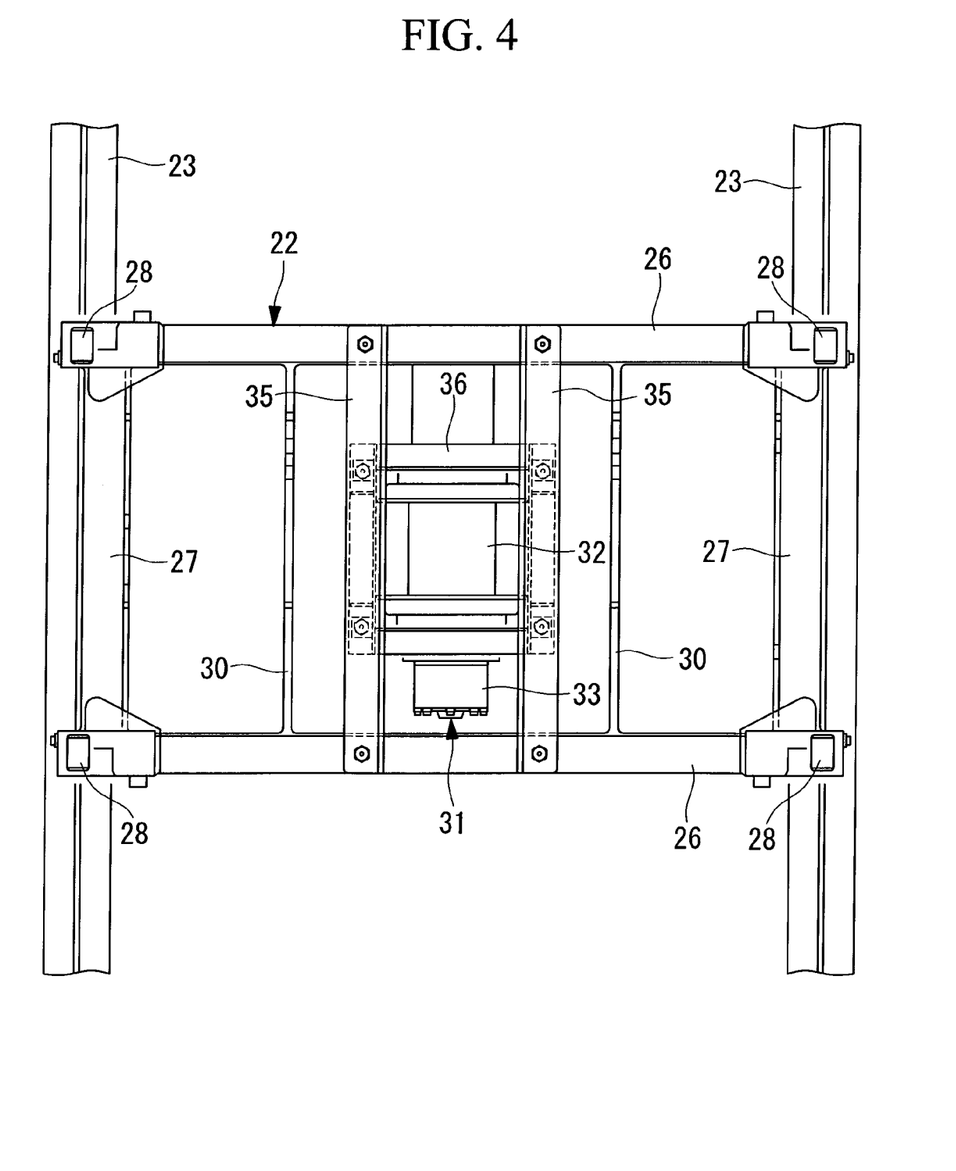
FIG. 4 is an enlarged partial top view illustrating the structure in a state where an ordinarily-installed winch is attached to a transversely extending winch girder of FIG. 3.
Figure 5:
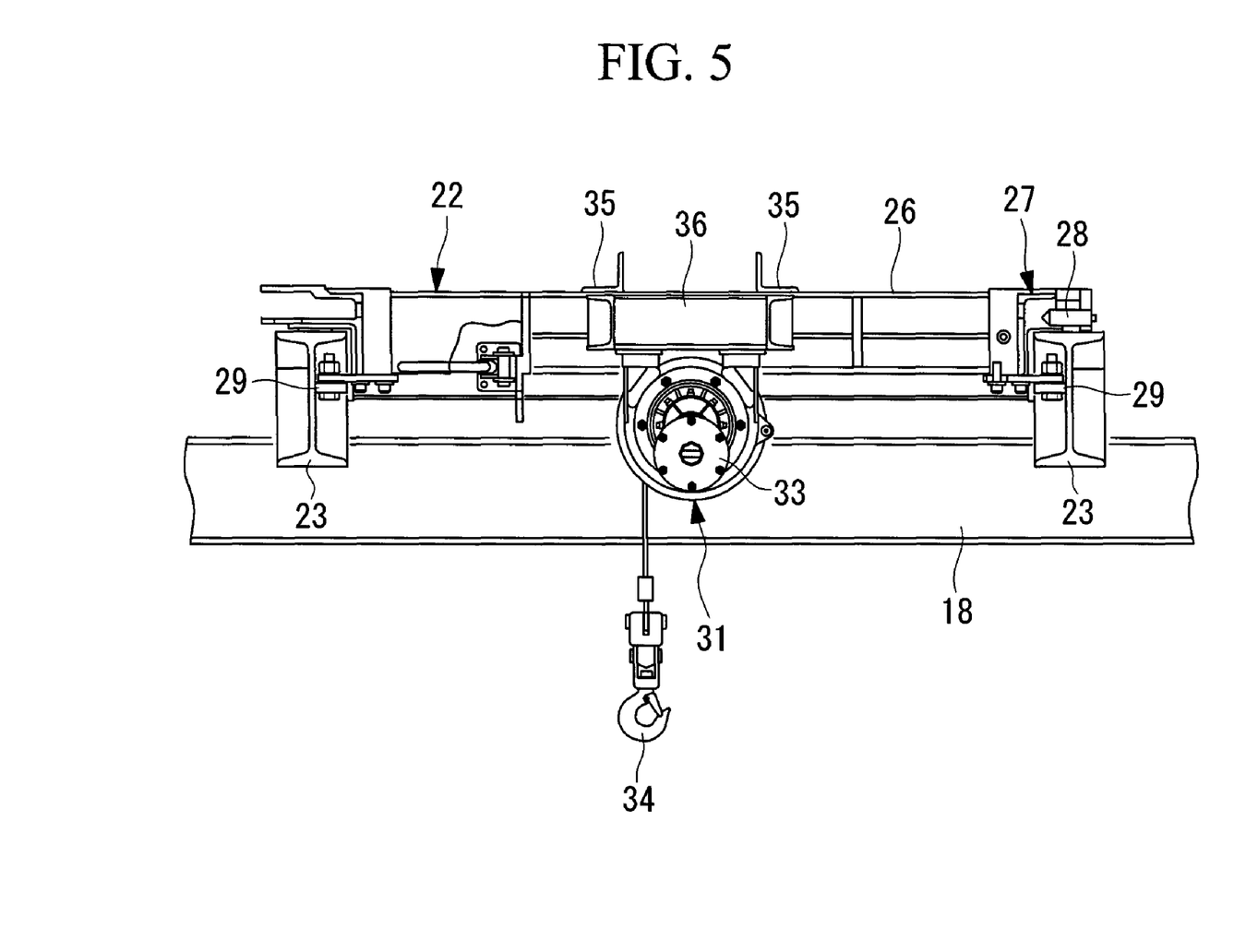
FIG. 5 is an enlarged partial side view illustrating the structure of the transversely extending winch girder of FIG. 4.

FIG. 4 is an enlarged partial top view illustrating the structure in a state where the ordinarily-installed winch is attached to a transversely extending winch girder of FIG. 3. FIG. 5 is an enlarged partial side view illustrating the structure of the transversely extending winch girder of FIG. 4.

As shown in FIG. 4, the transversely extending winch girder 22 includes a pair of supporting frames 26 extending in the longitudinal direction (the horizontal direction in FIG. 4) of the nacelle 3 and arranged so as to extend over the pair of the transversely extending rails 23, a pair of transversely extending frames 27 connecting both the supporting frames 26, transversely extending rollers 28 arranged between the upper face of the transversely extending rails 23 and the supporting frames 26 or the transversely extending frames 27, and side rollers 29 (see FIG. 5) arranged between the side faces of the transversely extending rails 23 and the supporting frames 26. As shown in FIG. 4, the transversely extending winch girder 22 has an approximately rectangular structure due to these supporting frames 26 and the transversely extending frames 27.

Furthermore, a pair of reinforcing members 30 that is used when the reciprocating winch 41 is attached is disposed so as to extend over the pair of supporting frames 26.

The ordinarily-installed winch 31 is used for carrying-in and carrying-out devices used for maintenance of the wind turbine 1, for example, consumables such as lubricant oil, and is detachably attached to the transversely extending winch girder 22. When the wind turbine 1 is operated, the ordinarily-installed winch 31 is attached to the transversely extending winch girder 22.

This embodiment will be described in terms of its application to an ordinarily-installed winch 31 having a capacity (ability) capable of winching materials with a weight of less than 500 kg up and down, but the ordinarily-installed winch 31 may have a capacity (ability) capable of winching materials with a weight of about 500 to 1000 kg up and down; it is not particularly limited.

The ordinarily-installed winch 31 includes a built-in drum 32 with a wire wound thereon and a motor 33 for rotating the built-in drum 32 to wind up or down the wire. An end of the wire is provided with a hook 34 used for carrying-in and carrying-out materials.

Between the ordinarily-installed winch 31 and the supporting frames 26 of the transversely extending winch girder 22, a pair of low-load attaching frames 35 extending over the pair of the supporting frames 26 and a rectangular bracket 36 arranged between the ordinarily-installed winch 31 and the low-load attaching frames 35 are disposed.

The low-load attaching frames 35 are detachably fixed to the supporting frames 26 with, for example, bolts and nuts, and support the bracket 36. The bracket 36 supports the ordinarily-installed winch 31.

Figure 6:
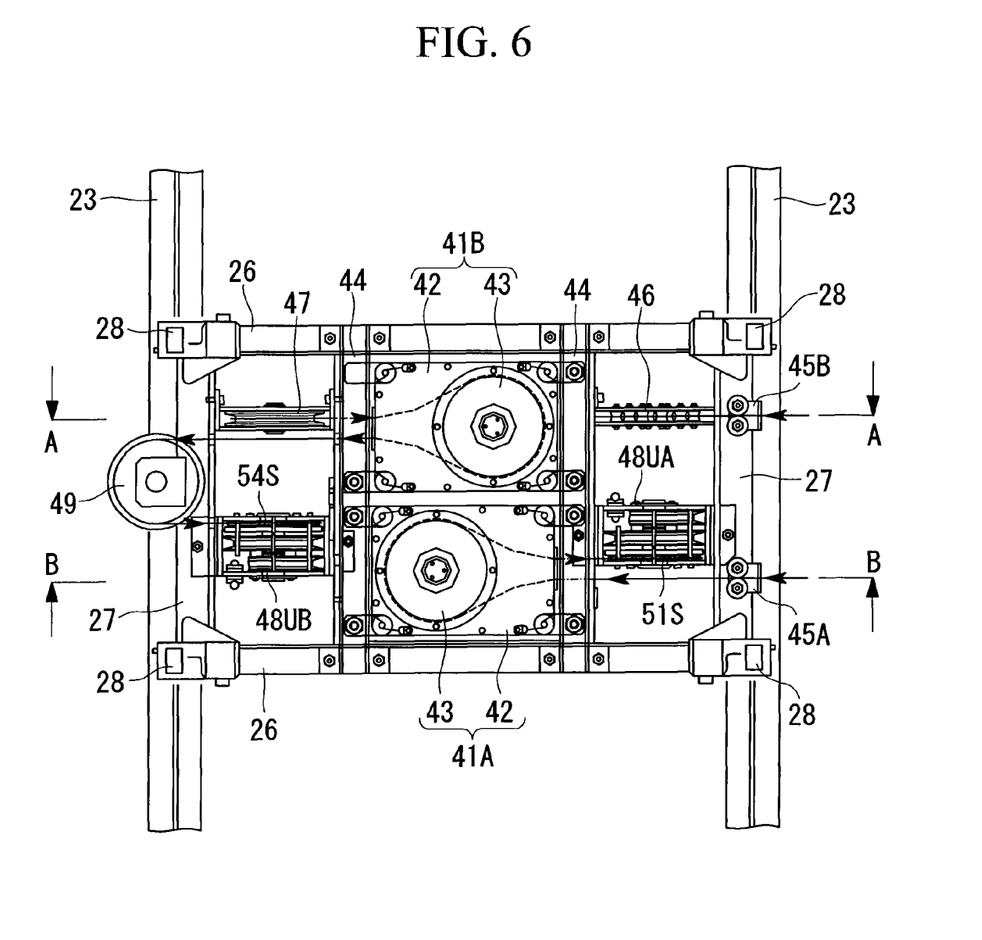
FIG. 6 is an enlarged partial top view illustrating the structure in a state where a reciprocating winch is attached to the transversely extending winch girder of FIG. 3.

Next, a structure in which the reciprocating winch 41, instead of the ordinarily-installed winch 31, is attached to the transversely extending winch girder 22 will be described.

FIG. 6 is an enlarged partial top view illustrating the structure in a state where a reciprocating winch is attached to the transversely extending winch girder of FIG. 3.

The reciprocating winch 41 is used for carrying-in and carrying-out objects such as the generator 71 and the transformer 72 of the electricity-generating equipment 5 and is detachably attached to the transversely extending winch girder 22. The reciprocating winch 41 is attached to the transversely extending winch girder 22 only when, for example, the generator 71 is replaced, with the ordinarily-installed winch 31 detached.

As shown in FIG. 6, the reciprocating winch 41 includes a chassis 42, a pair of wire openings (not shown) provided in the chassis 42, and a drawing portion 43 for drawing the wire in the chassis 42. With such a structure, the wire introduced to the drawing portion 43 through one of the openings is drawn and is then introduced to the outside of the chassis 42 through the other opening.

The transversely extending winch girder 22 is provided with two reciprocating winches, i.e., a first reciprocating winch (reciprocating winch) 41A and a second reciprocating winch (reciprocating winch) 41B aligned in the width direction (the vertical direction in FIG. 6) of the nacelle 3.

This embodiment will be described in terms of its application to a reciprocating winch 41 having a capacity (ability) capable of winching materials with a weight of about 1000 kg up and down.

Furthermore, this embodiment will be described in terms of an application in which two reciprocating winches 41 are attached to the transversely extending winch girder 22, but the number of reciprocating winches 41 is not particularly limited and may be one or three or more.

Between the first and second reciprocating winches 41A and 41B and the supporting frames 26, a pair of high-load attaching frames 44 is disposed so as to extend over the pair of the supporting frames 26, and the first and second reciprocating winches 41A and 41B are attached to the high-load attaching frames 44.

The first reciprocating winch 41A is arranged so as to have the wire opening facing rearward (rightward in FIG. 6) of the nacelle 3, and the second reciprocating winch 41B is arranged so as to have the wire opening facing frontward (leftward in FIG. 6) of the nacelle 3.

The high-load attaching frames 44 are detachably fixed to the reinforcing members 30 (see FIG. 4) with, for example, bolts and nuts.

The reinforcing members 30 support the load applied to first and second upper pulley portions 48UA and 48UB, described below, together with the transversely extending frames 27 when, for example, the generator 71 is replaced.

As shown in FIG. 6, the transversely extending winch girder 22 is further provided with a first guide 45A guiding the wire to the first reciprocating winch 41A, a second guide 45B guiding the wire to the second reciprocating winch 41B, a first pulley portion 46, a second pulley 47, the first and second upper pulley portions 48UA and 48UB constituting movable pulleys 48, and a third pulley 49 guiding the wire from the second reciprocating winch 41B to the second upper pulley portion 48UB.

Figure 7:
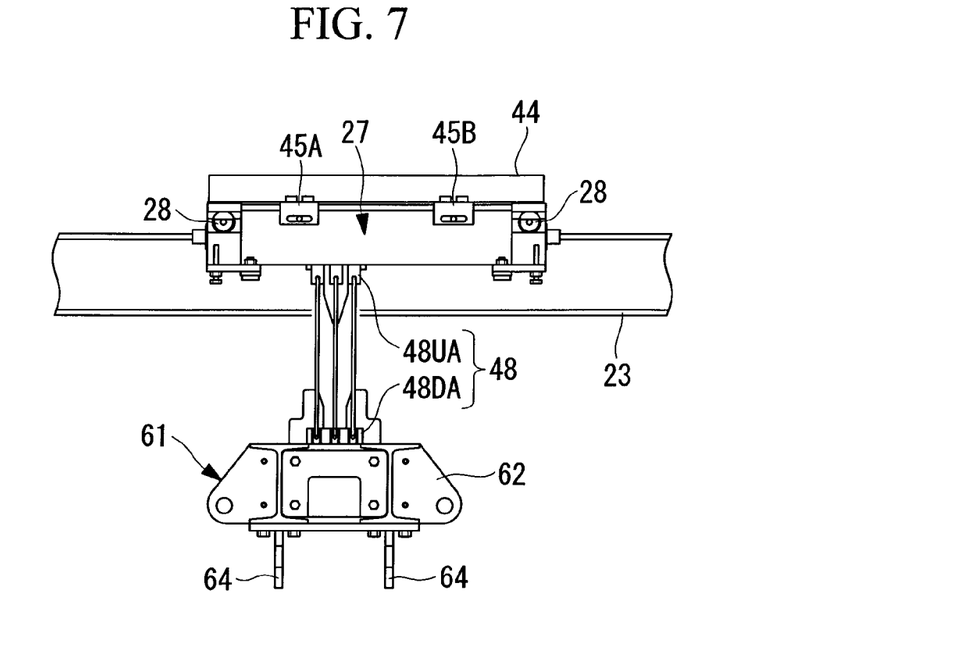
FIG. 7 is an enlarged partial side view illustrating the structure of the transversely extending girder of FIG. 6.

FIG. 7 is an enlarged partial side view illustrating the structure of the transversely extending girder of FIG. 6.

As shown in FIGS. 6 and 7, the first and second guides 45A and 45B guide the wire guided from the back of the nacelle 3 to the first and second reciprocating winches 41A and 41B, respectively, and are each composed of a pair of guide rollers that face each other.

The first and second guides 45A and 45B are detachably attached to the transversely extending frame 27 at the rear side of the nacelle 3 so as to be aligned in the width direction of the nacelle 3. Specifically, the first guide 45A is arranged at a position facing the first reciprocating winch 41A, and the second guide 45B is arranged at a position facing the second reciprocating winch 41B.

The wire guided to the first guide 45A is guided to the first upper pulley portion 48UA via the first reciprocating winch 41A, and the wire guided to the second guide 45B is guided to the first pulley portion 46.

Figure 8:
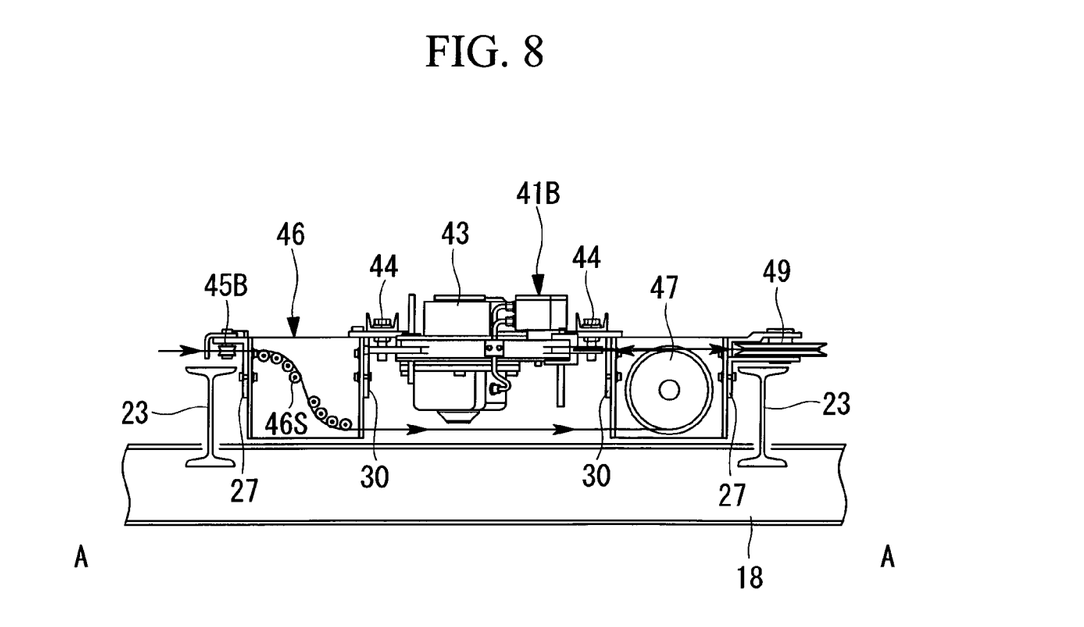
FIG. 8 is a cross-sectional view taken along the line A-A of FIG. 6, illustrating the structure of the transversely extending girder.

FIG. 8 is a cross-sectional view taken along the line A-A of FIG. 6, illustrating the structure of the transversely extending girder.

As shown in FIGS. 6 and 8, the first pulley portion 46 guides the wire guided to the second guide 45B to the lower side (the lower side in FIG. 8) of the second reciprocating winch 41B.

The first pulley portion 46 is detachably arranged, between the transversely extending frame 27 and the reinforcing member 30 of the rear side of the nacelle 3, at a position adjacent to the second reciprocating winch 41B.

The first pulley portion 46 includes a plurality of first small rollers 46S for guiding the wire. The first small rollers 46S are arranged on a smoothly curved line composed of a circular arc protruding upward and a circular arc protruding downward.

This embodiment will be described in terms of an application in which eight first small rollers 46S are used, but the number of first small rollers 46S is not particularly limited and may be more or less than eight.

The second pulley 47 is wound with the wire between the first pulley portion 46 and the second reciprocating winch 41B and modifies the direction in which the wire is guided to the back of the nacelle 3 and also guides the wire guided to below the second reciprocating winch 41B to the same height as the second reciprocating winch 41B.

The second pulley 47 is detachably arranged, between the transversely extending frame 27 and the reinforcing member 30 of the front side of the nacelle 3, at a position adjacent to the second reciprocating winch 41B.

The third pulley 49 is wound with the wire between the second reciprocating winch 41B and the second upper pulley portion 48UB and modifies the direction of the wire extending from the second reciprocating winch 41B toward the front of the nacelle 3 to the back of the nacelle 3.

The third pulley 49 is detachably arranged at a position adjacent to the second reciprocating winch 41B in the transversely extending frame 27 of the front side of the nacelle 3.

Figure 9:
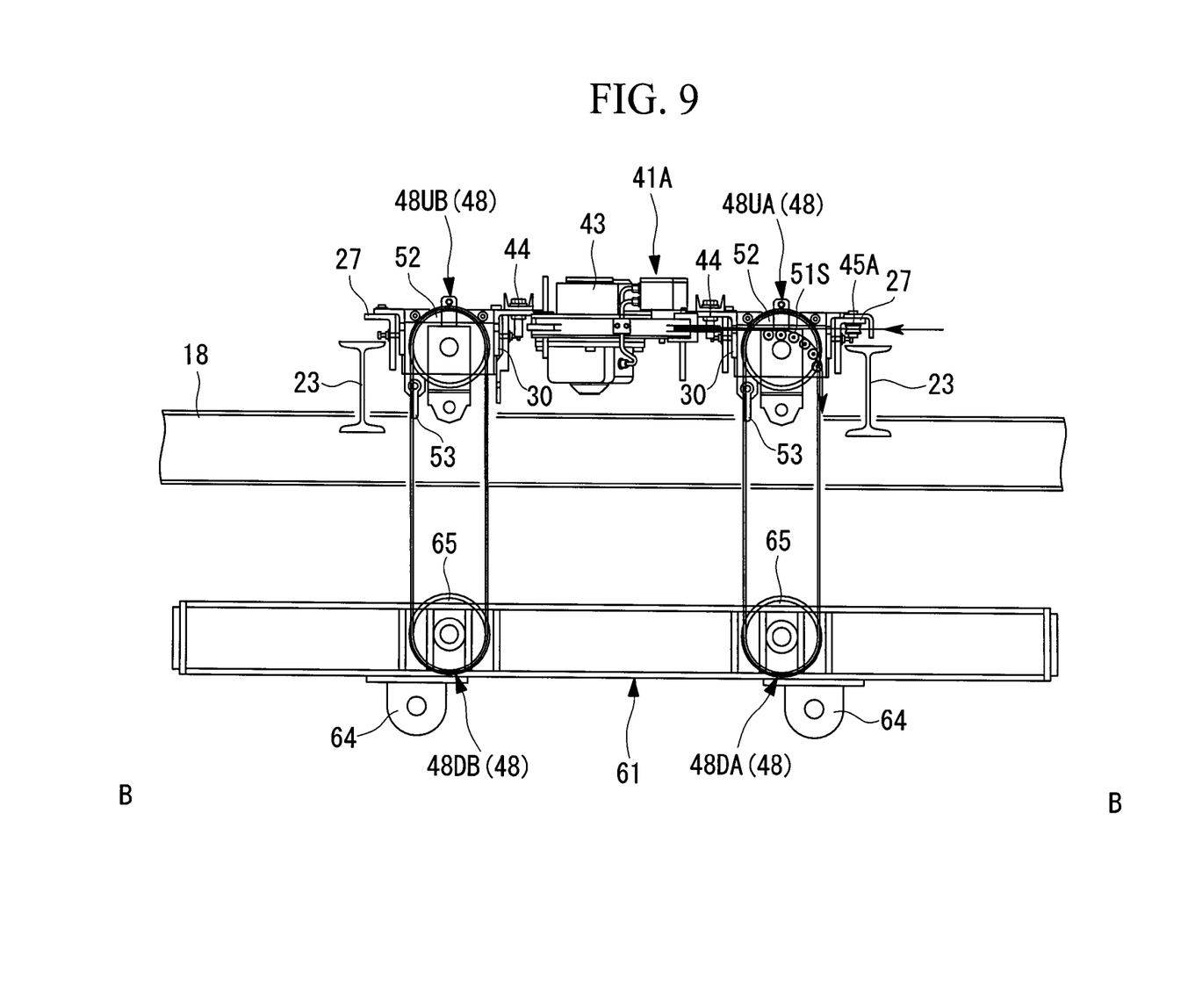
FIG. 9 is a cross-sectional view taken along the line B-B of FIG. 6, illustrating the structure of the transversely extending girder.

FIG. 9 is a cross-sectional view taken along the line B-B of FIG. 6, illustrating the structure of the transversely extending girder.

As shown in FIGS. 6 and 9, the first and second upper pulley portions 48UA and 48UB pair with the first and second lower pulley portions 48DA and 48DB, respectively, of a balance 61 described below to constitute the movable pulleys 48.

The first upper pulley portion 48UA is detachably arranged, between the transversely extending frame 27 and the reinforcing member 30 of the rear side of the nacelle 3, at a position adjacent to the first reciprocating winch 41A. The second upper pulley portion 48UB is detachably arranged, between the transversely extending frame 27 and the reinforcing member 30 of the front side of the nacelle 3, at a position adjacent to the first reciprocating winch 41A.

As shown in FIG. 9, the first upper pulley portion 48UA includes a plurality of second small rollers 51S, two upper pulleys 52, and a fixing unit 53 fixing an end of the wire. In the first upper pulley portion 48UA, the second small rollers 51S and the two upper pulleys 52 are aligned in the order of the second small rollers 51S, one upper pulley 52, and the other upper pulley 52 from the first reciprocating winch 41A side toward the second reciprocating winch 41B side.

The plurality of second small rollers 51S is wound with the wire between the first reciprocating winch 41A and the first lower pulley portion 48DA. This embodiment will be described in terms of an application in which six second small rollers 51S are used, but the number of second small rollers 51S is not particularly limited and may be less or more than six.

In the first upper pulley portion 48UA, the plurality of second small rollers 51S is aligned along the circular arc having approximately the same radius as that of the upper pulley 52 over about a quarter of the circle. The uppermost second small roller 51S is arranged at approximately the same height as that of the opening of the first reciprocating winch 41A, and the other second small rollers 51S are arranged at approximately the same intervals along the circular arc toward the lower side according to the distance from the first reciprocating winch 41A.

The two upper pulleys 52 are, together with lower pulleys 65 of the first lower pulley portion 48DA, wound with the wire. The two upper pulleys 52 are arranged on the same axis and are arranged at positions higher than the plurality of second small rollers 51S.

The fixing unit 53 is a member fixing an end of the wire and is disposed on the bottom face of the first upper pulley portion 48UA. Specifically, the end of the wire wound between the first upper pulley portion 48UA and the first lower pulley portion 48DA is fixed to the fixing unit 53.

As in the first upper pulley portion 48UA, the second upper pulley portion 48UB includes a plurality of third small rollers 54S, two upper pulleys 52, and a fixing unit 53 fixing an end of the wire. In the second upper pulley portion 48UB, the third small rollers 54S and the two upper pulleys 52 are aligned in the order of one upper pulley 52, the other upper pulley 52, and the third small rollers 54S from the first reciprocating winch 41A side toward the second reciprocating winch 41B side.

The plurality of third small rollers 54S is wound with the wire between the second reciprocating winch 41B and the second lower pulley portion 48DB. This embodiment will be described in terms of an application in which six third small rollers 54S are used, but the number of third small rollers 54S is not particularly limited and may be less or more than six.

In the second upper pulley portion 48UB, the plurality of third small rollers 54S is aligned along a circular arc having approximately the same radius as that of the upper pulley 52 over about a quarter of the circle. The uppermost third small roller 54S is arranged at approximately the same height as that of the third pulley 49, and the other third small rollers 54S are arranged at approximately the same intervals along the circular arc toward the lower side according to the distance from the third pulley 49.

The two upper pulleys 52 are, together with the lower pulleys 65 of the second lower pulley portion 48DB, wound with the wire. The two upper pulleys 52 are arranged on the same axis and are arranged at positions higher than the plurality of third small rollers 54S.

The fixing unit 53 is a member fixing an end of the wire and is disposed on the bottom face of the second upper pulley portion 48UB. Specifically, the end of the wire wound between the second upper pulley portion 48UB and the second lower pulley portion 48DB is fixed to the fixing unit 53.

As shown in FIGS. 7 and 9, the transversely extending winch girder 22 is further provided with the balance 61 for supporting the generator 71 to be replaced.

The balance 61 includes a support 62 supporting, for example, the generator 71 to be replaced, and the first and second lower pulley portions 48DA and 48DB, together with the first and second upper pulley portions 48UA and 48UB, respectively, constituting the movable pulleys 48.

The support 62 is a member extending in the longitudinal direction (the horizontal direction in FIG. 9) of the nacelle 3.

The bottom face of the support 62 is provided with engaging portions 64 for engaging with, for example, the generator 71 at four positions. To the support 62, the first and second lower pulley portions 48DA and 48DB are arranged at positions corresponding to the first and second upper pulley portions 48UA and 48UB, respectively.

The first and second lower pulley portions 48DA and 48DB are each provided with three lower pulleys 65. These three lower pulleys 65 are aligned on the same axis in the width direction of the nacelle 3.

As shown in FIG. 3, the electricity-generating equipment 5 includes the generator 71 receiving the rotation driving force transmitted from the rotor head 4 and generating electricity and includes the transformer 72 converting the electricity generated by the generator 71 to AC power having a predetermined frequency (for example, 50 Hz or 60 Hz). With this, the rotation of the rotor head 4 is converted to a predetermined power.

The generator 71 and the transformer 72 are aligned in the width direction (the horizontal direction in FIG. 3) of the nacelle on the lower frame 12 in the nacelle 3. The generator 71 is connected to the gear box 16 via a shaft transmitting a rotation driving force and is connected to the transformer 72 via a wire guiding the generated electricity.

A method of generating electricity in the wind turbine 1 having the above-described structure will now be roughly described.

In the wind turbine 1, the wind force blowing against the wind turbine blades 6 from the direction of the rotation axis of the rotor head 4 is converted to a motive force causing the rotor head 4 to rotate around the rotation axis.

This rotation of the rotor head 4 is transmitted to the gear box 16. The gear box 16 increases the speed of the rotation transmitted from the rotor head 4 and transmits the speeded-up rotation to the generator 71. The generator 71 generates electricity from the transmitted rotation according to the rotating speed. The generated electricity is inputted to the transformer 72 and is converted there to electricity suitable for a receiver of the electricity, for example, AC electricity with a frequency of 50 Hz or 60 Hz.

Here, in order to make the wind power effectively act on the wind turbine blades at least during the generation of electricity, the rotor head 4 is made to face the wind by appropriately turning the nacelle 3 on a horizontal plane.

Here, the method of replacing electricity-generating equipment, which is a feature of the present invention, will be described.

Figure 10:
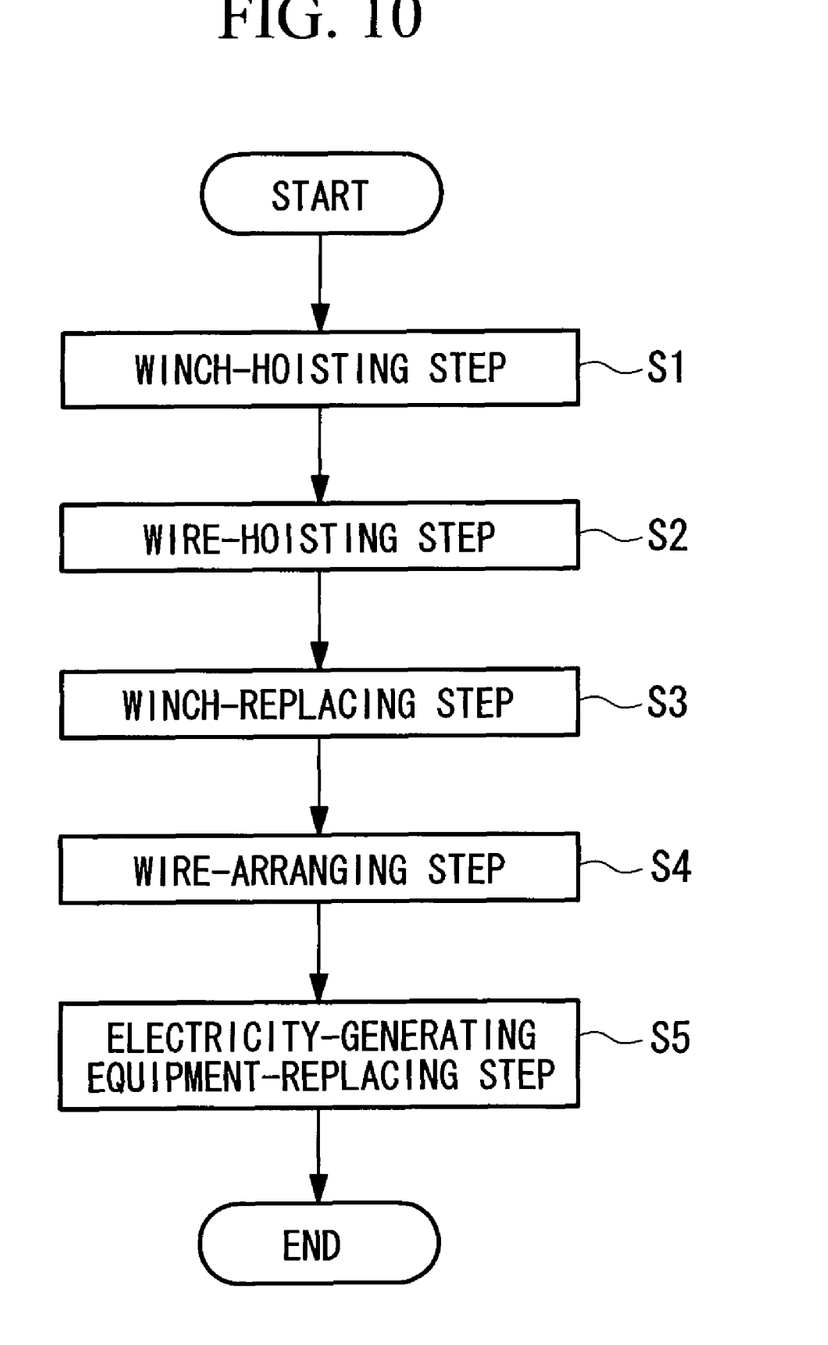
FIG. 10 is a flow chart illustrating a work flow for replacing electricity-generating equipment in the wind turbine of FIG. 1.
Figure 11:
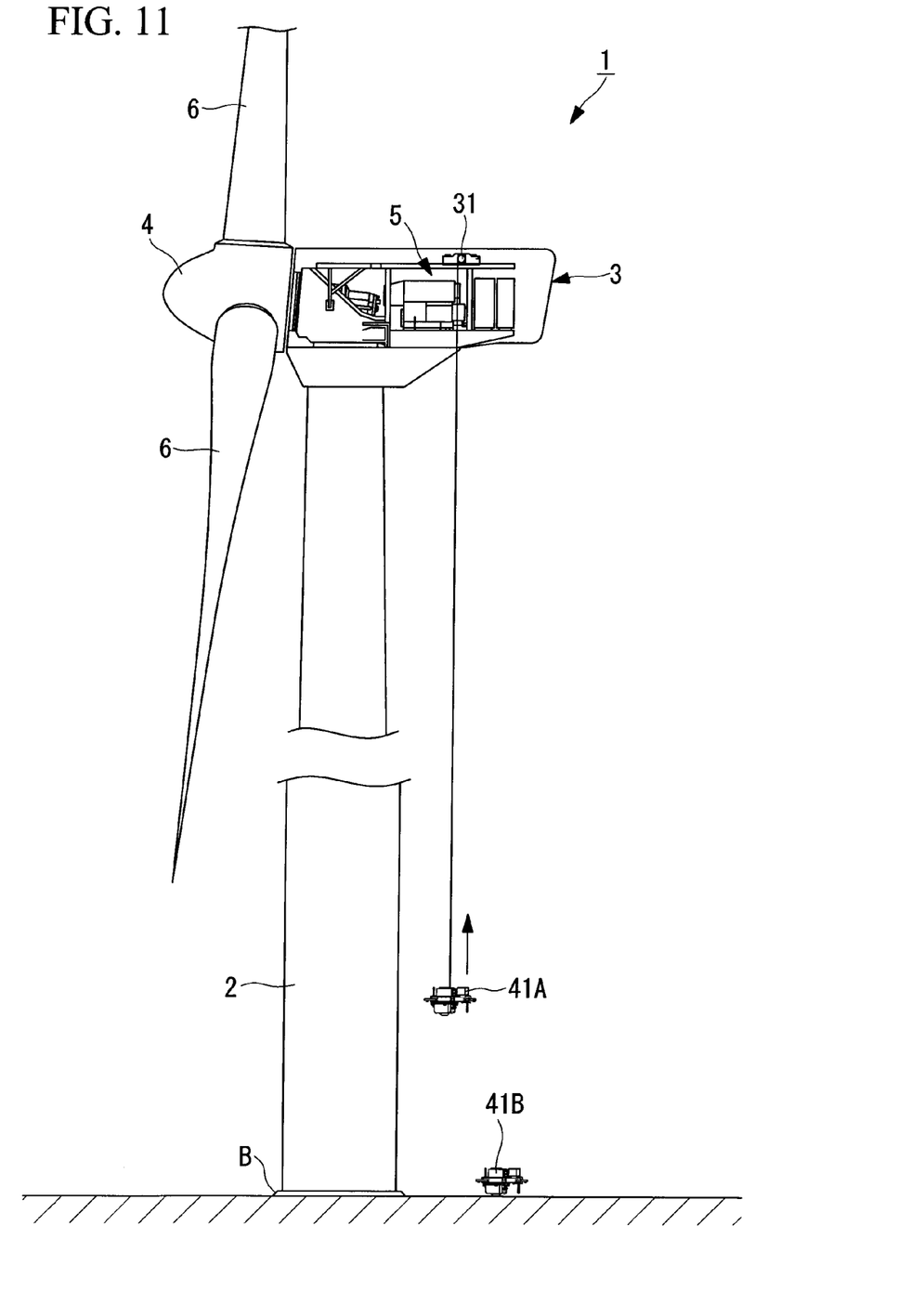
FIG. 11 is a schematic view illustrating hoisting of first and second reciprocating winches in the wind turbine of FIG. 1.

FIG. 10 is a flow chart illustrating a work flow for replacing electricity-generating equipment in the wind turbine of FIG. 1. FIG. 11 is a schematic view illustrating hoisting of first and second reciprocating winches in the wind turbine of FIG. 1.

In the wind turbine 1, when the electricity-generating equipment 5, such as the generator 71 or the transformer 72, is replaced, as shown in FIGS. 10 and 11, first, the ordinarily-installed winch 31 hoists the first and second reciprocating winches 41A and 41B, the first and second guides 45A and 45B, the first pulley portion 46, the second pulley 47, the third pulley 49, the first and second upper pulley portions 48UA and 48UB, the balance 61, and so on into the nacelle 3 (S1: winch hoisting step). In FIG. 11, in order to simplify the description, only the first and second reciprocating winches 41A and 41B are shown.

Figure 12:
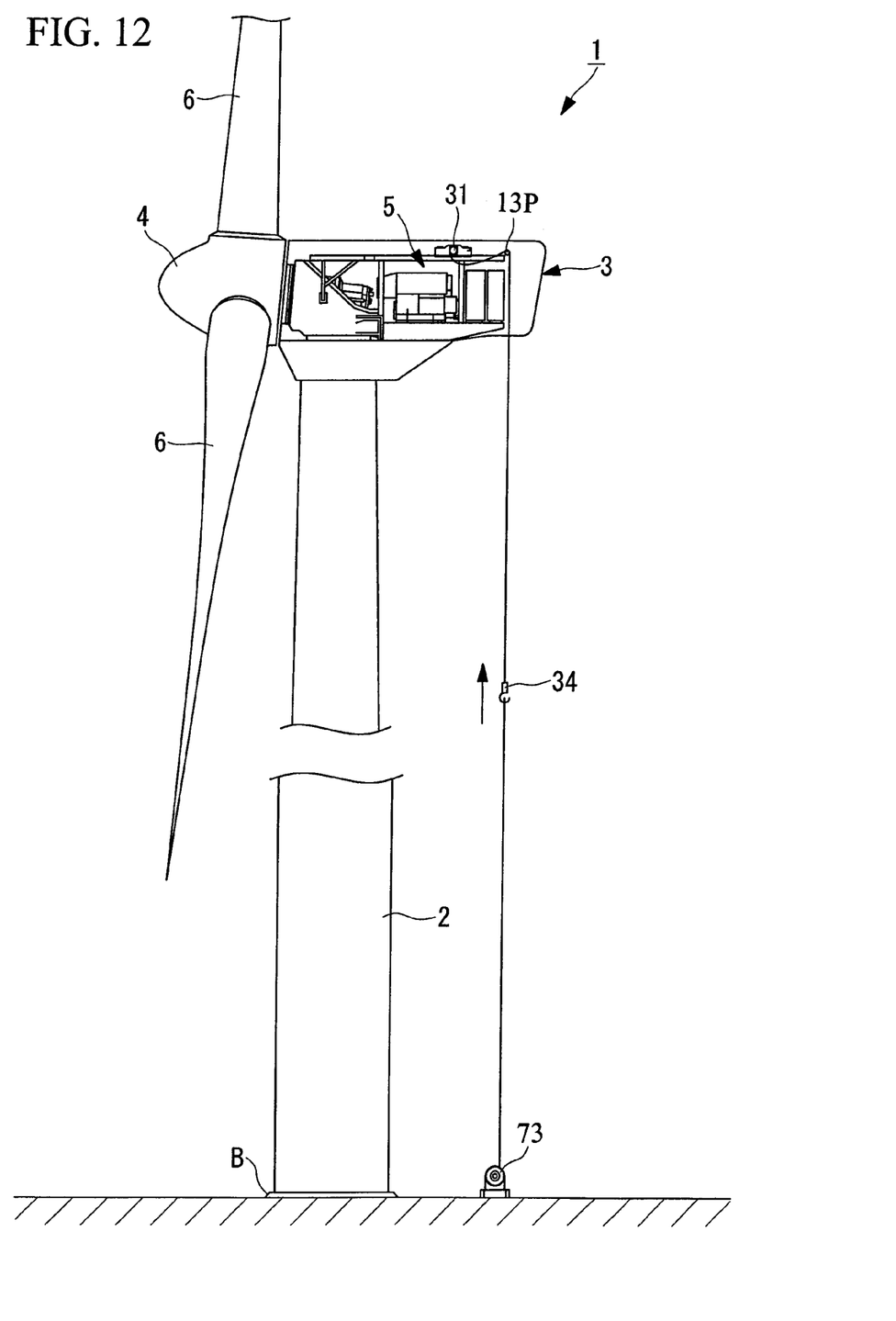
FIG. 12 is a schematic view illustrating hoisting of wire in the wind turbine of FIG. 1.

FIG. 12 is a schematic view illustrating hoisting of the wire in the wind turbine of FIG. 1.

Then, as shown in FIGS. 10 and 12, the wire of the ordinarily-installed winch 31 is lifted down from the back of the nacelle 3, and the wires for replacing the electricity-generating equipment 5, which are wound on the two drums 73 installed on the ground, are hoisted up to the nacelle 3 (S2: wire hoisting step).

Specifically, the wire of the ordinarily-installed winch 31 is lifted down via a guiding pulley 13P disposed at the rear end of the upper frame 13. The wires for replacement, hoisted up to the nacelle 3, are temporarily fixed in the nacelle 3 via the guiding pulley 13P.

In this embodiment, the total length of the wires for replacement that are wound on the drums 73 is at least about seven times the height (length) from the ground to the nacelle 3. Accordingly, it is possible to supply the wires from the drums 73 disposed on the ground to the nacelle and also to carry in and carry out the electricity-generating equipment 5 between the ground and the nacelle 3 using the movable pulleys 48 where the wire reciprocates three times.

Figure 13:
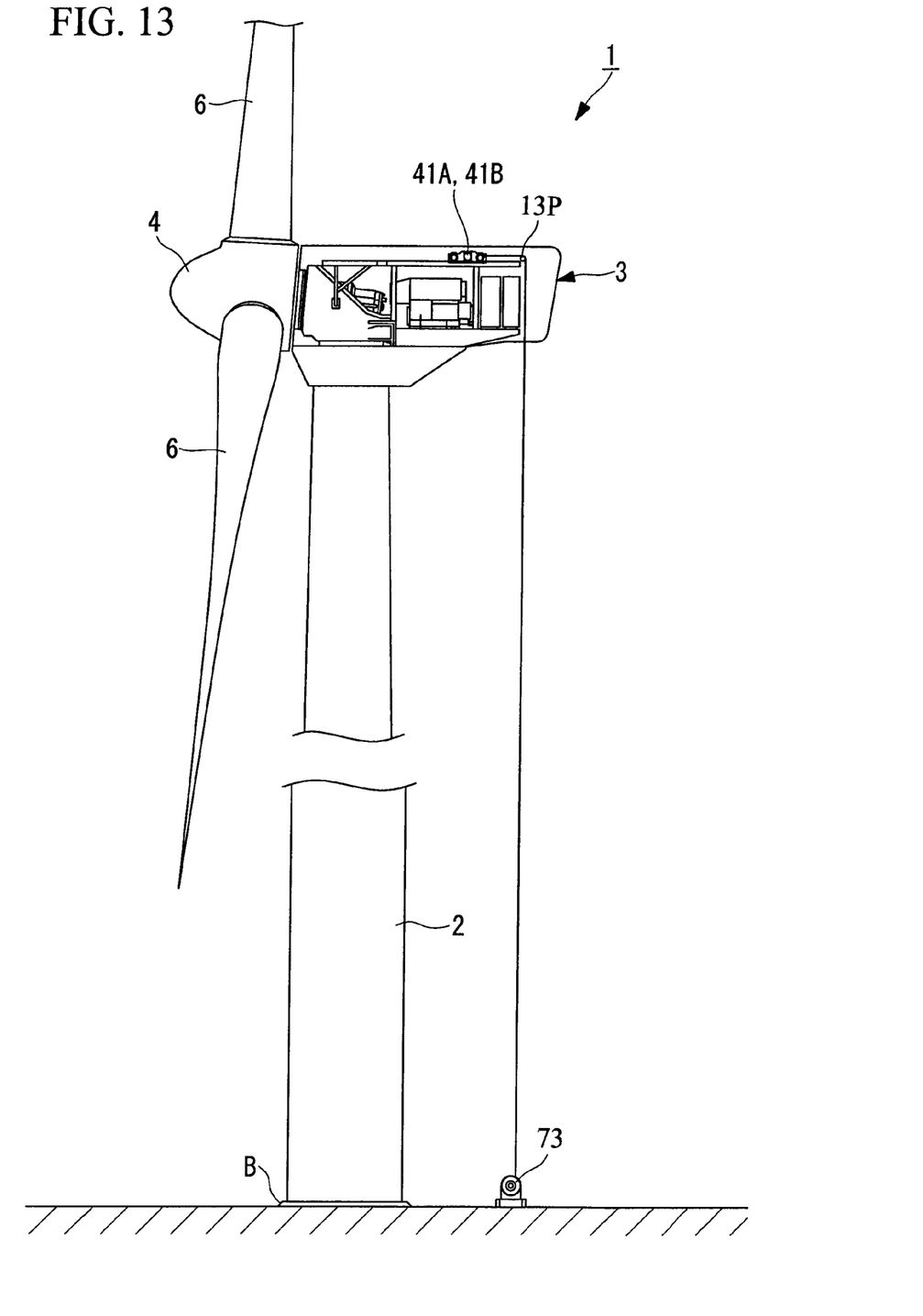
FIG. 13 is a schematic view illustrating replacement of the winch in the wind turbine of FIG. 1.

FIG. 13 is a schematic view illustrating replacement of the winch in the wind turbine of FIG. 1.

Then, as shown in FIGS. 10 and 13, after the hoisting of the wires for replacement, the ordinarily-installed winch 31 is replaced by the first and second reciprocating winches 41A and 41B (S3: winch replacing step).

Specifically, first, the ordinarily-installed winch 31, the bracket 36, and the low-load attaching frames 35 are detached from the transversely extending winch girder 22 (see FIG. 4). Then, the high-load attaching frames 44, the first and second guides 45A and 45B, the first pulley portion 46, the second pulley 47, the third pulley 49, the first and second upper pulley portions 48UA and 48UB, and the first and second reciprocating winches 41A and 41B are attached to the transversely extending winch girder 22 (see FIG. 6).

The detached ordinarily-installed winch 31, the bracket 36, and the low-load attaching frames 35 are stored in a vacant space in the nacelle 3.

After the attachment of the first and second reciprocating winches 41A and 41B to the transversely extending winch girder 22, the wires for replacement, which are temporarily fixed in the nacelle 3, are each applied to the first and second reciprocating winches 41A and 41B and the movable pulleys 48 (S4: wire arranging step).

Specifically, as shown in FIG. 6, one of the wires for replacement is made to pass through the first guide 45A and then one of openings of the first reciprocating winch 41A and is wound on the drawing portion 43 and then is drawn out from the other opening.

The wire drawn out from the first reciprocating winch 41A is wound on the plurality of second small rollers 51S of the first upper pulley portion 48UA and then wound on the lower pulleys 65 at the first reciprocating winch 41A side of the first lower pulley portion 48DA (see FIG. 9). Then, the wire is wound on the upper pulley 52 at the center of the first upper pulley portion 48UA, the lower pulley 65 at the center of the first lower pulley portion 48DA, the upper pulley 52 at the second reciprocating winch 41B side of the first upper pulley portion 48UA, and the lower pulley 65 at the second reciprocating winch 41B side of the first lower pulley portion 48DA.

Lastly, the wire is fixed to the fixing unit 53 of the first upper pulley portion 48UA.

On the other hand, the other wire for replacement is made to pass through the first pulley portion 46, the second pulley 47, and the second reciprocating winch 41B, in this order, from the second guide 45B. The way in which the wire passes through the second reciprocating winch 41B is the same as that of the first reciprocating winch 41A.

The wire drawn from the second reciprocating winch 41B is wound on the plurality of third small rollers 54S of the second upper pulley portion 48UB and is wound on the lower pulley 65 at the second reciprocating winch 41B side of the second lower pulley portion 48DB (see FIG. 9). Then, the wire is wound on the upper pulley 52 at the center of the second upper pulley portion 48UB, the lower pulley 65 at the center of the second lower pulley portion 48DB, the upper pulley 52 at the first reciprocating winch 41A side of the second upper pulley portion 48UB, and the lower pulley 65 at the first reciprocating winch 41A side of the second lower pulley portion 48DB.

Lastly, the wire is fixed to the fixing unit 53 of the second upper pulley portion 48UB.

By the above, the preparation for replacement of the electricity-generating equipment 5 is completed, and the replacement operation (S5: electricity-generating equipment replacing step) of the electricity-generating equipment 5 is started.

Figure 14:
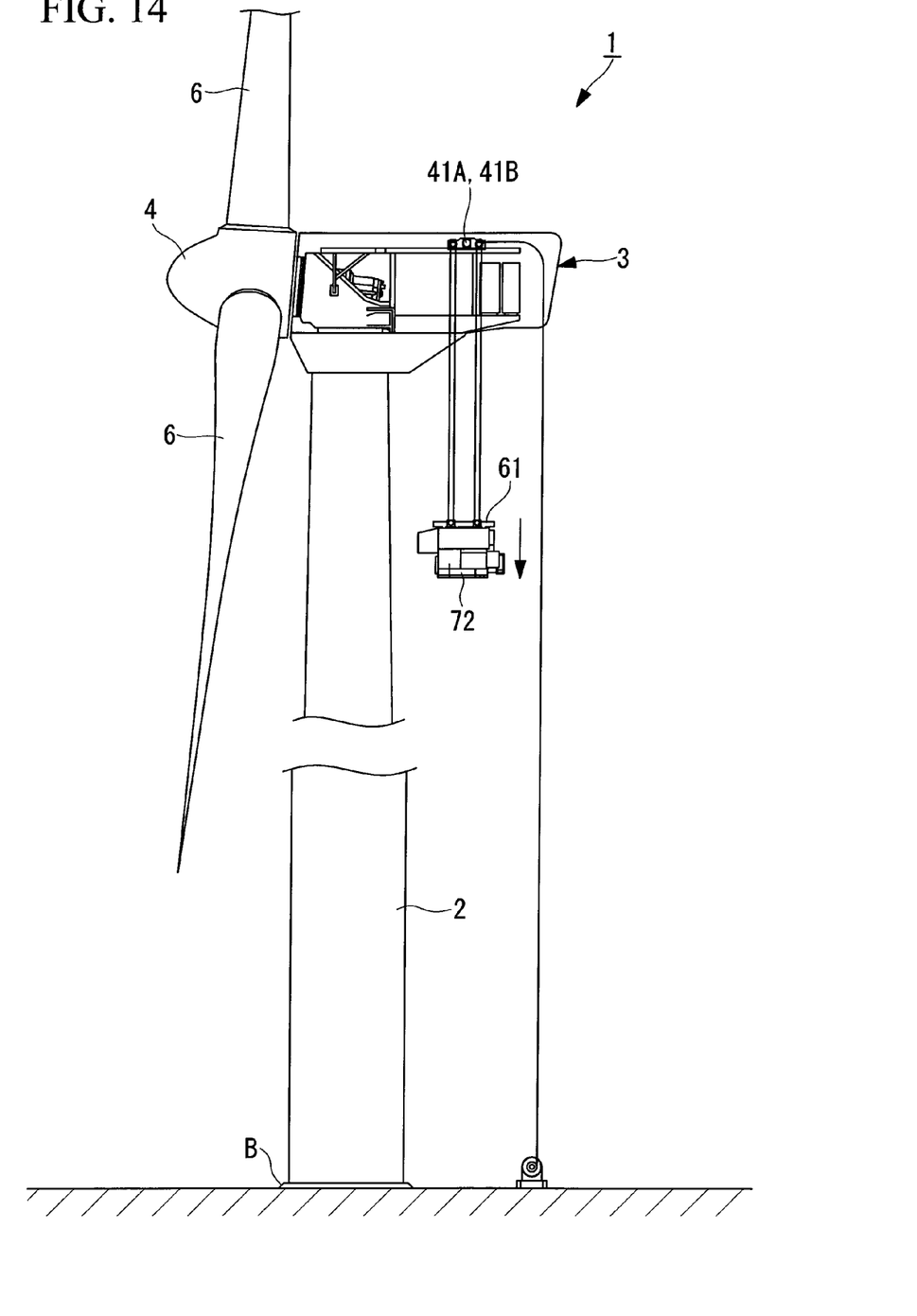
FIG. 14 is a schematic view illustrating a state where carrying-in or carrying-out of electricity-generating equipment is conducted in the wind turbine of FIG. 1.

FIG. 14 is a schematic view illustrating a state where carrying-in or carrying-out of electricity-generating equipment is conducted in the wind turbine of FIG. 1.

First, the carrying-out of the electricity-generating equipment 5 will be described. As shown in FIGS. 10 and 14, in the carrying-out, first, the balance 61 is attached to the electricity-generating equipment 5, for example, to the generator 71. Specifically, the engaging portions 64 of the balance 61 are engaged with the suspending portion (not shown) at the upper side of the generator 71.

Then, the generator 71 is lifted up from the lower frame 12 by winching the wire with the first and second reciprocating winches 41A and 41B. Then, the generator 71 is moved to the upper side of the opening (not shown) of the lower frame 12 by moving the longitudinally extending winch girder 21 and the transversely extending winch girder 22.

Then, the generator 71 is lifted down to the ground from the nacelle 3 by unwinding the wire with the first and second reciprocating winches 41A and 41B. Thus, the carrying-out operation is completed.

On this occasion, the weight of the generator 71 is supported by the first and second reciprocating winches 41A and 41B and other components, but is not supported by the drum 73.

In the carrying-in of the electricity-generating equipment 5, the above-described carrying-out process is similarly conducted in the reverse order.

According to the above-mentioned process, by changing from the ordinarily-installed winch 31 having the built-in drum 32 to the first and second reciprocating winches 41A and 41B not having drums and by supplying wire that is used for replacing the electricity-generating equipment 5 from the drum 73 disposed on the ground, it is possible to use the movable pulleys 48 whose usable length of wire is long. By doing so, the ability or capacity required in the first and second reciprocating winches 41A and 41B can be reduced compared with the case where the movable pulleys 48 are not used. Therefore, the cost for the replacement operation can be reduced. In addition, since the electricity-generating equipment 5 can be replaced without using, for example, large heavy machinery, the replacement operation is easier, resulting in a reduction in the cost for the replacement operation.

Since the wires for replacing the electricity-generating equipment 5 are hoisted from the drum 73 disposed on the ground, it is not necessary to ensure a space in the nacelle 3 for disposing the drum 73. In particular, since the required length of the wire when using the movable pulley 48 is long, the size of the drum 73 for winding the wire tends to be large. Even in such a case, the nacelle 3 can be prevented from increasing in size by disposing the drum 73 on the ground. Consequently, the cost for replacing the electricity-generating equipment 5 can be reduced.

The invention claimed is:

1. A method of replacing wind turbine equipment, comprising:
    winching up to a nacelle mounted atop a tower a reciprocating winch and a balance, wherein said winching is performed with a winch provided on a girder that moves in the nacelle;
    hoisting a wire to the nacelle from a drum disposed on a ground;
    detaching the winch from the girder and attaching the reciprocating winch to the girder;
    attaching the balance to the wind turbine equipment to be replaced; and
    arranging the hoisted wire on the reciprocating winch and a movable pulley provided between the balance and the girder.

* * * * *